(No Model.)
E. SCOTT.
IMPLEMENT FOR REPAIRING PNEUMATIC TIRES.
No. 581,945.                    Patented May 4, 1897.
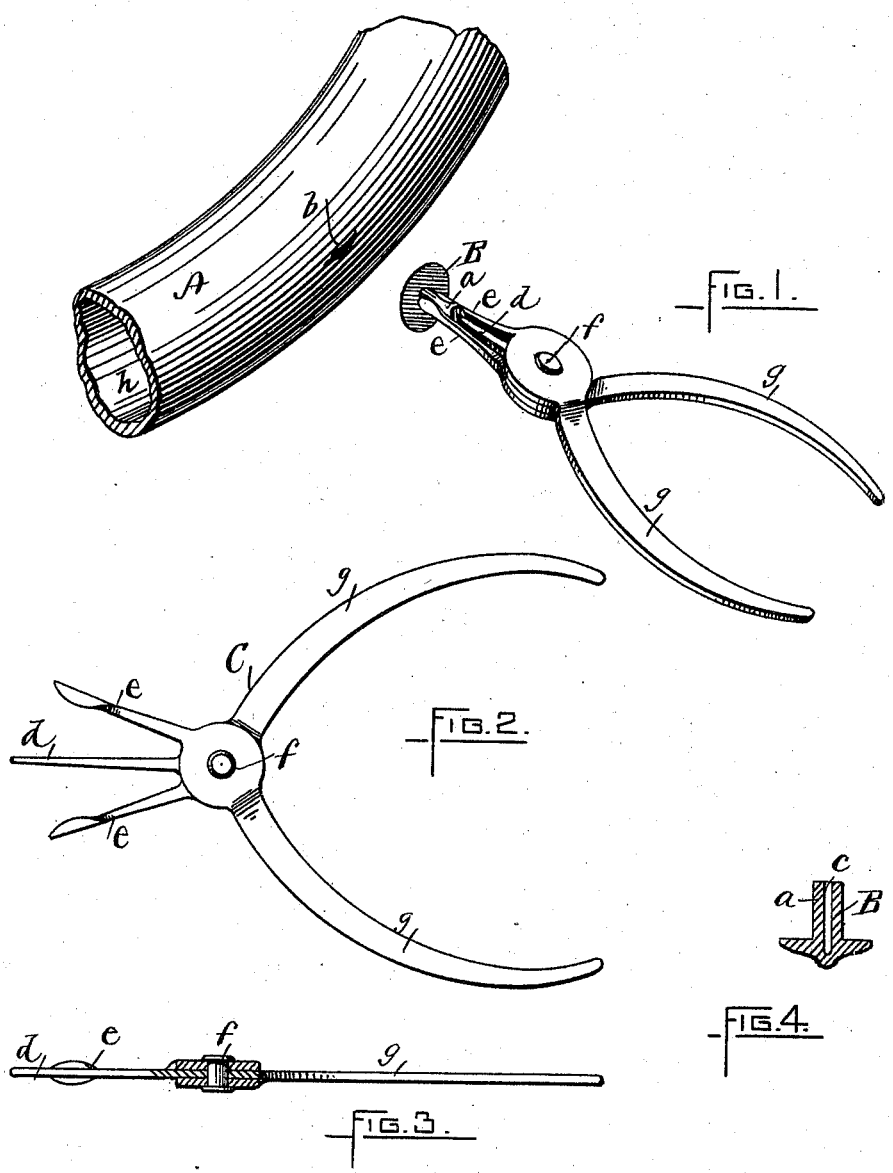
WITNESSES:
Harry J. Garceau
John Paton
INVENTOR:
Ernest Scott
BY S. Scholfield
ATTY.

UNITED STATES PATENT OFFICE.

ERNEST SCOTT, OF PROVIDENCE, RHODE ISLAND, ASSIGNOR TO THE MECHANICAL FABRIC COMPANY, OF SAME PLACE.

IMPLEMENT FOR REPAIRING PNEUMATIC TIRES.

SPECIFICATION forming part of Letters Patent No. 581,945, dated May 4, 1897.

Application filed March 1, 1897. Serial No. 625,647. (No model.)

*To all whom it may concern:*

Be it known that I, ERNEST SCOTT, a citizen of the United States, residing at Providence, in the State of Rhode Island, have invented a new and useful Improvement in Implements for Repairing Pneumatic Tires, of which the following is a specification.

My invention relates to an improved hand-operated implement for firmly seizing the hollow stem of the closing patch and inserting the patch into the accidental perforation of the tire to effect the proper closure of the same; and it consists in the combination of opposite hand-operated jaws pivoted to each other, with an intermediate pivoted tongue which serves as a central forcer for the insertion of the patch, as hereinafter fully set forth.

In the accompanying drawings, Figure 1 represents a perspective view showing a perforated section of a pneumatic tire and the repairing patch held in the jaws of the implement by means of which the patch is to be inserted. Fig. 2 represents a side view of the implement. Fig. 3 represents a section taken in the line 3 3 of Fig. 2. Fig. 4 represents a longitudinal section of the repairing patch.

In the drawings, A represents a piece of a pneumatic tire in which has been formed an accidental perforation $b$. The repairing-patch B is shown in section in Fig. 4 and is provided with a hollow stem $a$, the cavity $c$ of which is adapted for the reception of the forcing-tongue $d$ of the implement C, the said implement consisting of the hand-operated jaws $e\ e$, connected to each other at the pivot $f$ for opposite inwardly-directed action when the handles $g\ g$ of the said jaws are brought toward each other by the pressure of the hand in which the implement is held. The forcing-tongue $d$, which enters the central cavity $c$ of the stem of the patch B, is held upon the pivot $f$, so that the said tongue will be automatically adjusted to a central position between the jaws $e\ e$ when in use, as shown in Fig. 1, the said jaws being preferably spread at their ends and laterally hollowed to fit the cylindrical sides of the stem $a$ of the patch, and when the patch is held in the jaws of the implement, as shown in Fig. 1, the patch may be forced through the perforation $b$ into the cavity $h$ of the tire, and then by drawing the patch backward the said patch will be brought to its proper seating against the inner side of the wall of the tire, and by means of this improved implement a perforated tire may be quickly and neatly repaired.

I claim as my invention—

The combination of the pivoted holding-jaws, with the intermediate forcing-tongue adapted to enter the cavity of the stem of the repairing-patch, substantially as described.

ERNEST SCOTT.

Witnesses:
SOCRATES SCHOLFIELD,
JOHN L. LYNCH.